United States Patent
Manion et al.

(10) Patent No.: US 7,496,648 B2
(45) Date of Patent: Feb. 24, 2009

(54) MANAGED PEER NAME RESOLUTION PROTOCOL (PNRP) INTERFACES FOR PEER TO PEER NETWORKING

(75) Inventors: Todd R. Manion, Redmond, WA (US); Robert D. Donner, Sammamish, WA (US); Radu Simionescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/691,764

(22) Filed: Oct. 23, 2003

(65) Prior Publication Data

US 2005/0108371 A1    May 19, 2005

(51) Int. Cl.
*G06F 15/173* (2006.01)

(52) U.S. Cl. .............. 709/223; 709/224; 709/245; 717/108; 717/120

(58) Field of Classification Search ........... 709/200, 709/201–203, 217–219, 223–224, 245; 717/106–108, 717/116, 120
See application file for complete search history.

(56) References Cited

U.S. PATENT DOCUMENTS

| | | | |
|---|---|---|---|
| 5,369,705 A | 11/1994 | Bird et al. | |
| 5,371,794 A | 12/1994 | Diffie et al. | |
| 5,386,542 A | 1/1995 | Brann et al. | |
| 5,509,010 A * | 4/1996 | La Porta et al. | 370/397 |
| 5,712,914 A | 1/1998 | Aucsmith et al. | |
| 5,748,736 A | 5/1998 | Mittra | |
| 5,761,421 A | 6/1998 | van Hoff et al. | |
| 5,806,075 A | 9/1998 | Jain et al. | |
| 5,832,514 A | 11/1998 | Norin et al. | |
| 5,854,898 A | 12/1998 | Riddle | |
| 5,901,227 A | 5/1999 | Perlman | |
| 5,907,685 A | 5/1999 | Douceur | |
| 5,917,480 A | 6/1999 | Tafoya et al. | |
| 5,922,074 A | 7/1999 | Richard et al. | |
| 5,933,849 A | 8/1999 | Srbljic et al. | |

(Continued)

FOREIGN PATENT DOCUMENTS

EP    1248441    10/2002

(Continued)

OTHER PUBLICATIONS

"*Microsoft Overhauls Longhorn Drivers for Usability, Connectivity,*" eWeek.com Enterprise News & Reviews, dated Dec. 14, 2005, 5 pages; http://www.eweek.com/article2/0,1759,1654462,00.asp.

(Continued)

*Primary Examiner*—Saleh Najjar
*Assistant Examiner*—Faruk Hamza
(74) *Attorney, Agent, or Firm*—Marshall, Gerstein & Borun LLP

(57) ABSTRACT

The managed system and methods of the present invention are segmented into 3 main areas: Clouds, Registrations, and Resolvers. The cloud object provides information about the clouds that are available. If a could is available, the Registration object can be used to register endpoints with the P2P name resolution protocol. Finally, if an application developer wishes to resolve a peer name to an IP address, they simply use the resolver object. The clouds may be monitored for state changes in one embodiment of the present invention through a CloudWatcher object.

6 Claims, 7 Drawing Sheets

U.S. PATENT DOCUMENTS

| | | | |
|---|---|---|---|
| 5,944,794 A | 8/1999 | Okamoto et al. | |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A | 10/2000 | Abadi et al. | |
| 6,148,383 A | 11/2000 | Micka et al. | |
| 6,155,840 A | 12/2000 | Sallette | |
| 6,163,809 A | 12/2000 | Buckley | |
| 6,205,481 B1 | 3/2001 | Heddaya et al. | |
| 6,216,110 B1 | 4/2001 | Silverberg | |
| 6,237,025 B1 | 5/2001 | Ludwig et al. | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 | 10/2002 | Whitner et al. | |
| 6,490,253 B1 | 12/2002 | Miller et al. | |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 | 12/2003 | Ginter et al. | |
| 6,675,205 B2 | 1/2004 | Meadway et al. | |
| 6,675,261 B2 | 1/2004 | Shandony | |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,748,530 B1 | 6/2004 | Aoki | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 | 11/2004 | Klug et al. | |
| 6,845,499 B2 * | 1/2005 | Srivastava et al. | 717/100 |
| 6,912,622 B2 | 6/2005 | Miller | |
| 6,920,455 B1 | 7/2005 | Weschler | |
| 6,968,179 B1 | 11/2005 | De Vries | |
| 6,976,258 B1 | 12/2005 | Goyal et al. | |
| 6,981,043 B2 | 12/2005 | Botz et al. | |
| 6,983,400 B2 | 1/2006 | Volkov | |
| 6,990,514 B1 | 1/2006 | Dodrill et al. | |
| 7,062,681 B2 | 6/2006 | Larsson et al. | |
| 7,065,587 B2 * | 6/2006 | Huitema et al. | 709/245 |
| 7,068,789 B2 | 6/2006 | Huitema et al. | |
| 7,073,132 B1 | 7/2006 | Rydahl et al. | |
| 7,085,814 B1 * | 8/2006 | Gandhi et al. | 709/208 |
| 7,114,146 B2 * | 9/2006 | Zhang et al. | 717/106 |
| 7,130,999 B2 | 10/2006 | Yasala et al. | |
| 7,139,760 B2 | 11/2006 | Manion et al. | |
| 7,159,223 B1 | 1/2007 | Comeau | |
| 7,178,129 B2 * | 2/2007 | Katz | 717/108 |
| 7,181,506 B1 * | 2/2007 | Vigue et al. | 709/219 |
| 7,181,620 B1 | 2/2007 | Hur | |
| 7,185,194 B2 | 2/2007 | Morikawa et al. | |
| 7,203,753 B2 * | 4/2007 | Yeager et al. | 709/225 |
| 7,206,805 B1 * | 4/2007 | McLaughlin, Jr. | 709/203 |
| 7,206,862 B2 * | 4/2007 | Wheeler | 709/245 |
| 7,213,060 B2 | 5/2007 | Kemp et al. | |
| 7,299,351 B2 | 11/2007 | Huitema et al. | |
| 7,398,307 B2 * | 7/2008 | Dorland | 709/223 |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 | 12/2002 | Traversat et al. | |
| 2002/0188881 A1 | 12/2002 | Liu et al. | |
| 2002/0194484 A1 | 12/2002 | Bolosky et al. | |
| 2003/0009570 A1 * | 1/2003 | Moskowitz et al. | 709/229 |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0196060 A1 | 10/2003 | Miller | |
| 2003/0217073 A1 | 11/2003 | Walther et al. | |
| 2004/0064693 A1 * | 4/2004 | Pabla et al. | 713/168 |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0111423 A1 | 6/2004 | Irving et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 | 7/2004 | Yeager et al. | |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0205243 A1 | 10/2004 | Hurvig et al. | |
| 2004/0242329 A1 | 12/2004 | Blackburn et al. | |
| 2004/0249970 A1 | 12/2004 | Castro et al. | |
| 2004/0260771 A1 | 12/2004 | Gusler et al. | |
| 2005/0004984 A1 | 1/2005 | Simpson | |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 | 4/2005 | Yeager et al. | |
| 2005/0102245 A1 | 5/2005 | Edlund et al. | |
| 2005/0102356 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |

| | | |
|---|---|---|
| 2005/0171799 A1 | 8/2005 | Hull et al. |
| 2005/0198173 A1 | 9/2005 | Evans |
| 2005/0235038 A1 | 10/2005 | Donatella et al. |
| 2008/0031460 A1 | 2/2008 | Brookner et al. |

FOREIGN PATENT DOCUMENTS

| | | |
|---|---|---|
| GB | 2378268 | 2/2003 |
| JP | 2002197246 | 7/2002 |
| JP | 2002335269 | 11/2002 |
| WO | WO-0120450 | 3/2001 |
| WO | WO-2005/046164 A1 | 5/2005 |

OTHER PUBLICATIONS

Beatty et al., "Web Services Dynamic Discovery (WS-Discovery)," Microsoft Corporation, dated Apr. 2005, 42 pages; http://msdn.microsoft.com/library/en-us/dnglobspec/html/WS-Discovery.pdf.
"METEOR-S Web Service Discovery Infrastructure," A Component of the METEOR-S System on Semantic Web Services and Processes; METEOR-S Web Service Discovery Infrastructure (MWSDI); dated Dec. 14, 2005, 2 pages; http://lsdis.cs.uga.edu/proj/meteor/mwsdi.html.
Sunaga et al., "Advanced Peer-to-Peer Network Platform for Various Services-SIONet (Semantic Information Oriented Network)", Proceedings of the Second International Conference on Peer-to-Peer Computing, IEEE, pp. 169-170 (2002).
Ratnasamy et al., "A Scalable Content-Addressable Network", SIGCOMM '01, ACM, pp. 161-172 (2001).
Saroiu et al., "A Measurement Study of Peer-to-Peer File Sharing Systems", Technical Report #UW-CSE-01-06-02, Department of Computer Science & Engineering, University of Washington, Seattle, Washington, 14 pages (2001).
Legedza et al., "Using Network-level Support to Improve Cache Routing", Hamilton et al., (Ed.), Computer Networks and ISDN Systems: The International Journal of Computer and Telecommunications Networking, vol. 30, No. 22-23, pp. 2193-2201 (1998).
Stoica et al., "Chord: A Scalable Peer-to-Peer Lookup Service for Internet Applications", SIGCOMM '01, ACM, pp. 149-160 (2001).
Clark et al., "Freenet: A Distributed Anonymous Information Storage and Retrieval System", H. Federrath (Ed.), Anonymity 2000, LNCS 2009, pp. 46-66 (2001).
Portmann et al., "The Cost of Peer Discovery and Searching in the Gnutella Peer-to-peer File Sharing Protocol", Proceedings Ninth IEEE International Conference on Networks, pp. 263-268 (2001).
Portmann, M., et al., "The Cost of Application-level Broadcast in a Fully Decentralized Peer-to-peer Network", Proceedings ISCC 2002 Seventh International Symposium, pp. 941-946 (2002).
Hong et al., "Dynamic Group Support in LANMAR Routing Ad Hoc Networks," IEEE, pp. 304-308 (2002).
Zhang et al., "gMeasure: A Group-based Network Performance Measurement Service for Peer-to-Peer Applications", IEEE Globecom 2002, 5 pgs (2002).
Xiao et al., "On Reliable and Scalable Peer-to-Peer Web Document Sharing", Proceedings of the International Parallel and Distributed Processing Symposium, IEEE, pp. 23-30 (2002).
Hoschek, Wolfgang, "A Unified Peer-to-Peer Database Framework for Scalable Service and Resource Discovery", M. Parasher (Ed.), GRIG 2002, LNCS 2536, pp. 126-144 (2002).
Balachander et al., "Early Measurements of a Cluster-Based Architecture for P2P Systems", IMW '01, ACM, pp. 105-109 (2001).
Labovitz et al., "Internet Routing Instability", SIGCOMM '97, ACM, pp. 115-126 (1997).
Joa-Ng, M. et al., "A GPS-based Peer-to-Peer Hierarchical Link State Routing for Mobile Ad Hoc Networks", IEEE 51st Vehicular Technology Conference Proceedings, vol. 3, pp. 1752-1756 (2000).
Zhao et al., "Tapestry: An Infrastructure for Fault-tolerant Wide-area Location and Routing", Report No. UCB/CSD-01-1141, Computer Science Division (EECS), University of California, Berkeley, California, 27 pgs (2001).
Kwon et al., "An Efficient Peer-to-Peer File Sharing Exploiting Hierarchy and Asymmetry", IEEE, pp. 226-233 (2003).

Joa-Ng, M. et al., "A Peer-to-Peer Zone-Based Two-Level Link State Routing for Mobile Ad Hoc Networks", IEEE Journal on Selected Areas in Communications, vol. 17, No. 8, pp. 1415-1425 (Aug. 1999).
Adam Langley, *The Freenet Protocol*, The Free Network Project, at http://freenet.sourceforge.net/index.php?page=protocol (last visited May 21, 2001).
Philip J. Erdelsky, *The Birthday Paradox*, EFG, at http://www.efgh.com/math/birthday.htm (last visited Mar. 8, 2002).
*Red-Black Tree*, National Institute of Standards and Technology, at http://www.nist.gov/dads/HTML/redblack.html (last visited Mar. 5, 2002).
Ellison, C., *SPKI Requirements*, (The Internet Society 1999), at http://www.ietf.org/rfc/rfc2692.txt?number=2692 (last visited Aug. 6, 2001).
Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).
Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).
"At What Cost Pervasive? A Social Computing View of Mobile Computing Systems," IBM Research: vol. 38, No. 4, 1999, Pervasive Computing (28 pgs.).
"*Connecting and Extending Peer-to-Peer Networks*," Lion Share White Paper, dated Oct. 2004, 32 pages, http://lionshare.its.psu.edu/main/info/docspresentation/LionshareWP.pdf.
"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).
"Microsoft Computer Dictionary," Fifth Edition, Microsoft Press, 2002p pp. 31, 238-239, 424, 467.
"Microsoft, Groove Networks to Combine Forces to Create Anytime, Anywhere Collaboration," Microsoft Presspass-Information for Journalists, retrievied from http://www.microsoft.com/prespass/features/2005/mar05/03-10GrooveQA.asp on May 31, 2005 (9 pages).
"News: Sun Incorporating JXTA into Products," java.net The Source for Java Technology Collaboration, Jan. 30, 2004, retrieved from http://today.java.net.pub/n/SunKXTA on Jun. 2, 2005 (1 page).
"Products: Groove Virtual Office FAX," Groove Networks, retrieved from http://www.groove.net/index.cfm?pagename=VO_FAX on May 31, 2005 (5 pages).
"Products: Groove Virtual Office," Groove Networks, retrieved from http://www.groove.net/index/cfm/pagename/VirtualOFfice on May 31, 2005 (2 pages).
"Products: Why Grove," Groove Networks, retrieved from http://www.grove/net/index/cfm?pagename=Products_Overview on May 31, 2005 (2 pages).
"Project JXTA: An Open, Innovative Collaboration," Sun Microsystems, Inc. Apr. 25, 2001, (pp. 1-5).
"Project JXTA: Technical Shell Overview," Sun Microsystems, Inc. Apr. 25, 2001; retrieved from http://www.jxta.org/project/www.docs/TechShellOverview.pdf on Aug. 10, 2006.
"Project JXTA: Technical Specification," Version 1.0, Sun Microsystems, Inc., Apr. 25 2001; retrieved from http://download.jxta.org/files/documents/27/12/JXTA-Spec.pdf on Aug. 10, 2006.
About Presentation Broadcasting, 3 pages printed Jul. 1, 2005 from http://office.microsoft.com/en-us/assistance/HP052411931033.aspx.
Adamic, L., "P2P Search that Scales," pre-presentation description for talk on Nov. 7, 2001, http://conferences.oreillynet.com/cs/p2web2001/view.
Bolcer et al., "Peer-to-Peer Architectures and the Magi™ Open-Source Infrastructure," Endeavors Technology, Inc., Dec. 6, 2000.
Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Castro et al., "*Secure Routing For Structured Peer-to-Peer Overlay Networks*," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Cheng et al., "Hutchworld: Lessons Learned. A Collaborative Project: Fred Hutchinson Cancer Research Center & Microsoft Research," in Proceedings of Second International Conference on Virtual Worlds (VW 2000), pp. 1-2 (Paris, France, Jul. 5-7, 2000). http://research.microsoft.com/scg/papers/hutchvw2000.pdf.

Cheung, "*Chatopus for Palm OS, Using IM Bots for Jabber*," Chatopus-Palm OS Instant Messaging Client for XMPP/Jabber, Dated Oct. 20, 2002 (Last updated: Jun. 25, 2005), 6 pages, http://www.chatopus.com/articles/bots.html.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Duhr, "Oberflachenelemente in interaktiven und kooperativen anwendungen," Universitat Oldenburg, Department of Information Systems Thesis (Aug. 2000).

European Search Report; EP 02 22 5770; Munich; Aug. 9, 2005; Examiner: E. Bertolossi.

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Garcia et al., "Extending a Collaborative Architecture to Support Emotional Awareness," EBAA '99—Workshop on Emotion-Based Agent Architectures, pp. 46-52 (May 2, 1999).

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, LEA Press, (1997).

Gutwin, "Workspace Awareness in Real-Time Distributed Groupware," The University of Calgary, Department of Computer Science, Ph.D. Thesis, 270 pages (Dec. 1997).

Handley et al., "SIP: Session Initiation Protocol," Network Working Group, Request for Comments 2543, pp. 1-153 (Mar. 1999).

Huitema, C., Distributed Peer-to-Peer Name Resolution, Presentation Slides from the O'Reilly Peer-to-Peer and Web Services Conferenec, Nov. 5, 2001.

Kollock et al., "Managing the Virtual Commons: Cooperation and Conflict in Computer Communities," in Computer-Mediated Communication: Llinguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

MeetingMaker—Meeting Maker printout, 2 pages printed on Jul. 1, 2005 from http://www.meetingmaker.com/products/meetingmaker/default.cfm.

MeetingMaker—WebEvent Publish printout, 2 pages printed on Jul. 1, 2005 from http://www.meetingmaker.com/products/webevent_publish/default.cfm.

Microsoft Corporation; "Introduction to Windows Peer-to-Peer Networking," Published: Jan. 2003.

Microsoft.com, "Peer-to-Per Common Documentation," http://msdn.microsoft.com/library/default.asp?url=/library/en-us/p2psdk/p2p/peer_to_common_documentation.asp, (last visited Aug. 5, 2005).

Morris, J.; Data Structures and Algorithms—Sections 8.3; Online Publication 1998; http://clips.ee.uwa.edu.au/{morris/Year2/PLDS210/hash_tables.html.>: Aug. 8, 2005.

Newmarch, J., "JXTA Overview," Oct. 7, 2002, retrieved from http://jan.netcomp.monash.edu.au/distjava/jxta.html on Jun. 2, 2005 (pp. 1-15).

Oram, A.,; Peer -to-Peer: Harnessing the Benefits of a Distruptive Technology Passage; Peer-to-Peer: Harnessing the Benefits of a Disruptive Technology; Mar. 15, 2001; pp. 94-122.

Partial European Search Report; EO 02 00 5770; Mar. 27, 2005.

QuickTime Broadcaster (3 pages) printed Jul. 1, 2005 from http://www.apple.com/quicktime/broadcaster/.

Reynolds, J., "BOOTP Vendor Information Extensions," Network Working Group, http://www.faqs.org/rfc/rfc1395.txt, retrieved Dec. 23, 2005, Jan. 1993.

Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).

Sedgewick R.; Algorithms in C—Third Edition—Part of Chapter XVI; Algorithms in C—Third Edition, 1998; pp. 662-691.

Sedgewick, R.; Algorithms in C—Third Edition—Chapter XIV; Algorithms in C++; 1998; pp. 573-608; Section 14.4.

SlidesNow! (3 pages) printed Jul. 1, 2005 from http://www.slidesnow.com/about.shtml.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

Stoica et al., A Scalable Peer-to-Peer Lookup Service for Internet Applications; MIT Technical Report; Mar. 23, 2001; http://www.lcs.mit.edu/publications/pubs/ps/MIT-LCS-TR-819.ps>.

Tanenbaum, Andrew S., "Computer Networks," Third Edition, Prentice Hall PTR, 1996; pp. 437-449.

The Best Way to Centrally Deploy Applications and Provide On-Demand Access, 2 pages printed Jul. 1, 2005 from http://www.citrix.com/English/ps2/products/product.asp? contentID=186.

Traversat et al., "Project JXTA Virtual Network," Sun Microsystems, Inc. Oct. 28, 2002 (pp. 1-10).

Zhao, et al., "A Web Based Multi-Display Presentation System," 2 pages printed Jul. 1, 2005 from http://www.fxpal.com/publications/FXPAL-PR-04-303.pdf.

* cited by examiner

MANAGED PEER NAME RESOLUTION PROTOCOL (PNRP) INTERFACES FOR PEER TO PEER NETWORKING

FIELD OF THE INVENTION

The present invention relates generally to peer-to-peer networking application programming interfaces (APIs), and more particularly to peer networking framework APIs and methods utilizing managed classes.

BACKGROUND OF THE INVENTION

Various communication technologies on the Internet allow users with common interest to collaborate, share files, chat with one another, multi-cast audio and video for presentations and group meetings, and engage in multi-player gaming. Currently, however, most communication on the Internet takes place in a server centric environment whereby all communication flows to or through large central servers to which individuals may connect to join and participate in such communication.

With the reemergence of peer-to-peer technology, the current server centric model of Internet communication is quickly being replaced. Indeed, peer-to-peer technologies enable users to contact one another in a serverless environment, free from the constraints of server based Internet communication. In a peer-to-peer based system, a users anonymity and privacy may be maintained since communication occurs directly between peers within the network. However, while individual communication and file sharing is relatively well established in peer-to-peer networks, establishing, discovering, joining, maintaining, and sharing information in a group peer-to-peer environment is not well established. However, individuals have grown accustomed to the benefits provided by such grouping technology in the server centric environment. Therefore, a need exists for technology that allows both the benefits of peer-to-peer technologies and grouping technologies to be realized in the serverless environment that is peer-to-peer.

Peer-to-peer communication, and in fact all types of communication, depend on the possibility of establishing valid connections between selected entities or nodes. These entities or nodes may be peers (e.g., users or machines) or groups formed within a peer-to-peer network. The connections between the nodes form the peer-to-peer graph that enables communication and information to be passed to and between the nodes. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks by maintaining a robust graph. That is, the better the information about other peers and groups in the network (i.e. the more robust the graph), the greater the likelihood that a search for a particular resource or record will converge.

Currently, P2P systems utilize a logical programming model that requires an extensive amount of code to implement. However, the assignee of the instant application has released the .NET framework programming model. Microsoft's .NET is software that connects information, people, systems, and devices. It spans clients, servers, and developer tools, and comprises the .NET Framework programming model that enables developers to build Web-based applications, smart client applications, and XML Web services applications which expose their functionality programmatically over a network using standard protocols such as SOAP and HTTP. .NET also includes developer tools, such as Microsoft Visual Studio® .NET, which provide a rapid application integrated development environment for programming with the .NET Framework. Further, .NET comprises a set of servers, including Microsoft Windows® 2000, Microsoft SQL Server™, and Microsoft BizTalk® Server, that integrates, runs, operates, and manages XML Web services and applications. Finally, .NET includes client software, such as Windows XP, Windows CE, and Microsoft Office XP, that helps developers deliver a deep and compelling user experience across a family of devices and existing products.

The .NET Framework is the programming model of the .NET environment for building, deploying, and running Web-based applications, smart client applications, and XML Web services. It manages much of the plumbing, enabling developers to focus on writing the business logic code for their applications. The .NET Framework includes the common language runtime and class libraries. The common language runtime is responsible for run time services such as language integration, security enforcement, memory, process, and thread management. In addition, it has a role at development time when features such as life-cycle management, strong type naming, cross-language exception handling, dynamic binding, and so on, reduce the amount of code that a developer must write to turn business logic into a reusable component.

The class libraries include base classes that provide standard functionality such as input/output, string manipulation, security management, network communications, thread management, text management, user interface design features, and other functions. The Microsoft ADO.NET data classes support persistent data management and include SQL classes for manipulating persistent data stores through a standard SQL interface. XML classes enable XML data manipulation and XML searching and translations. The Microsoft ASP-.NET classes support the development of Web-based applications and XML Web services. The Windows Forms classes support the development of Windows-based smart client applications. Together, the class libraries provide a common, consistent development interface across all languages supported by the .NET Framework.

However, despite the clear advantages provided the .NET environment, there are currently no P2P systems that take advantage of the benefits provided by this environment.

BRIEF SUMMARY OF THE INVENTION

The inventive concepts disclosed in this application involve a new and improved managed programming system and method for establishment and management of a peer-to-peer (P2P) network. More specifically, the present invention is directed to a new and improved object-oriented set of managed interfaces and methods that developers can use to create peer networking applications. By utilizing the managed interfaces of the present invention, which may be used with the .NET Framework, the complicated details of the underlying Win32 implementation are hidden from the developer.

The managed system and methods of the present invention are segmented into 3 main areas: Clouds, Registrations, and Resolvers. The cloud object provides information about the clouds that are available. If a cloud is available, the Registration object can be used to register endpoints with the P2P name resolution protocol. Finally, if an application developer wishes to resolve a peer name to an IP address, they simply use the resolver object. The clouds may be monitored for state changes in one embodiment of the present invention through a cloud watcher object.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
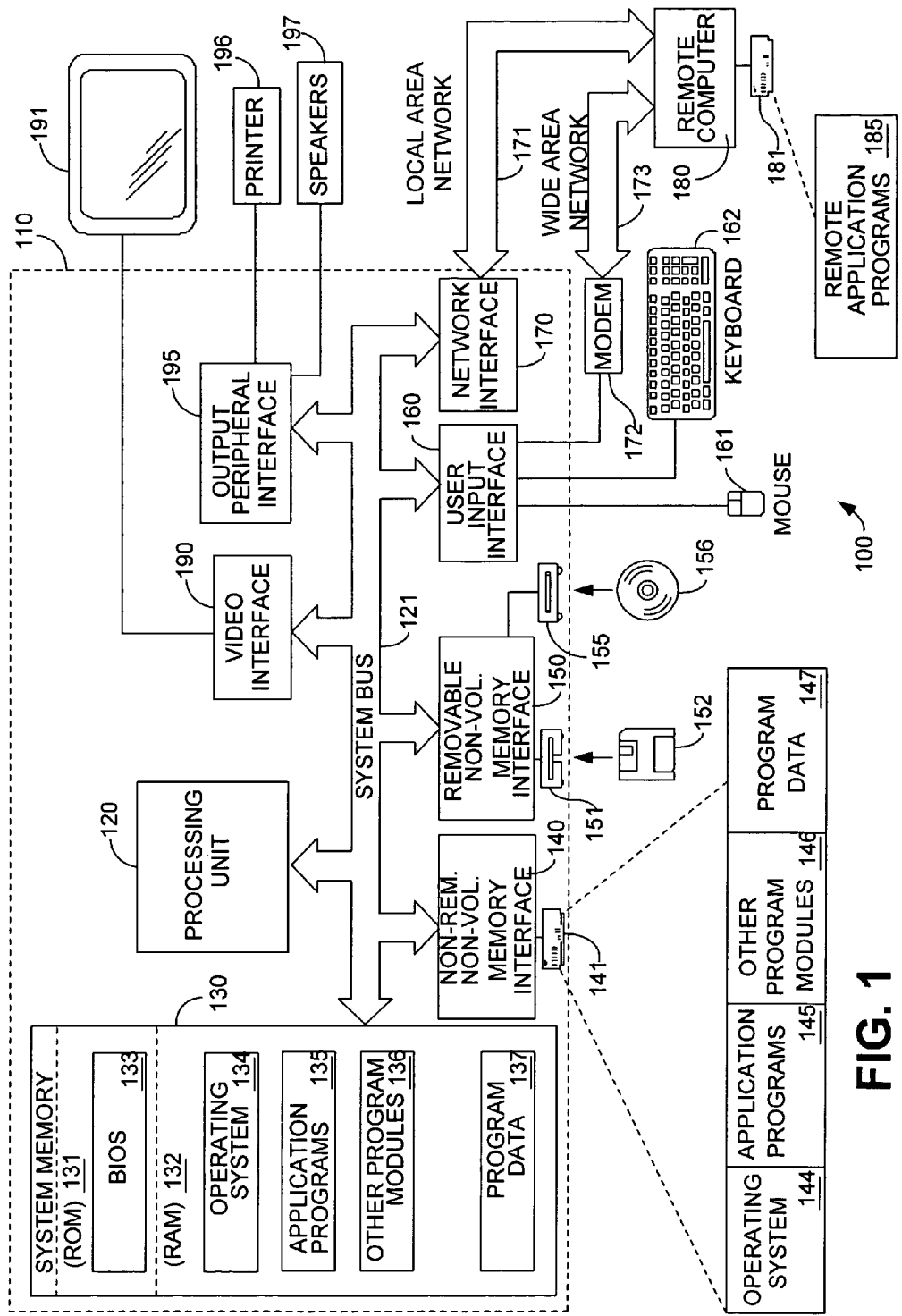
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network member, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Indeed, a programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2:
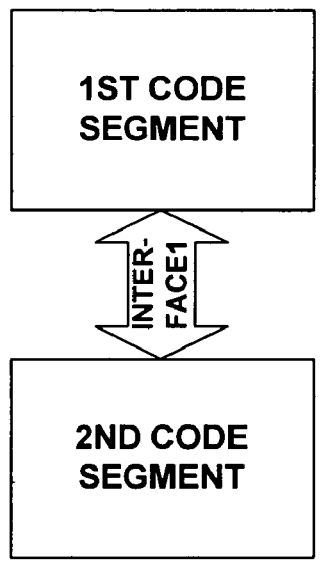
FIG. 2 is a simplified block diagram illustrating a programming interface between two code segments.
Figure 3:
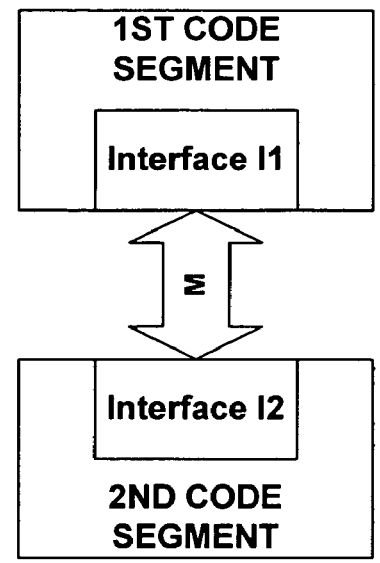
FIG. 3 is a simplified block diagram illustrating an alternate embodiment of a programming interface between two code segments.

Notionally, a programming interface may be viewed generically, as shown in FIG. 2 or FIG. 3. FIG. 2 illustrates an interface Interface 1 as a conduit through which first and second code segments communicate. FIG. 3 illustrates an interface as comprising interface objects I1 and I2 (which may or may not be part of the first and second code segments), which enable first and second code segments of a system to communicate via medium M. In the view of FIG. 3, one may consider interface objects I1 and I2 as separate interfaces of the same system and one may also consider that objects I1 and I2 plus medium M comprise the interface. Although FIGS. 2 and 3 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2 and 3, but they nonetheless perform a similar function to accomplish the same overall result. We will now briefly describe some illustrative alternative implementations of a programming interface.

A. Factoring

Figure 4:
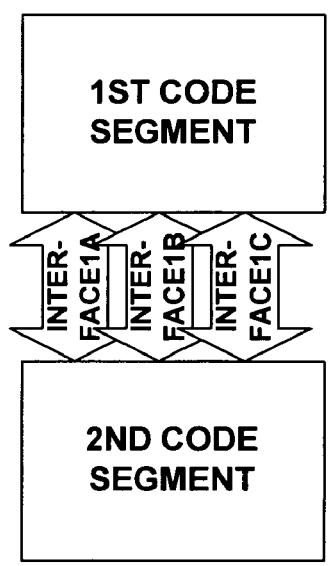
FIG. 4 is a simplified block diagram illustrating a programming interface between two code segments having communications that are broken into multiple discrete communications, illustrating the concept of factoring.
Figure 5:
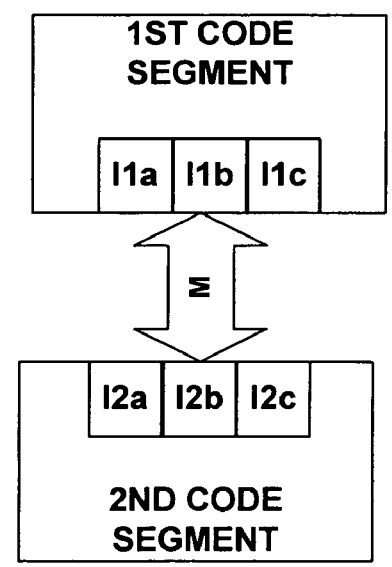
FIG. 5 is a simplified block diagram illustrating an alternate embodiment of a programming interface between two code segments having communications that are broken into multiple discrete communications, illustrating the concept of factoring.

A communication from one code segment to another may be accomplished indirectly by breaking the communication into multiple discrete communications. This is depicted schematically in FIGS. 4 and 5. As shown, some interfaces can be described in terms of divisible sets of functionality. Thus, the interface functionality of FIGS. 2 and 3 may be factored to achieve the same result, just as one may mathematically provide 24, or 2 times 2 time 3 times 2. Accordingly, as illustrated in FIG. 4, the function provided by interface Interface1 may be subdivided to convert the communications of the interface into multiple interfaces Interface1A, Interface 1B, Interface 1C, etc. while achieving the same result. As illustrated in FIG. 5, the function provided by interface 11 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the $1^{st}$ code segment need not match the number of interfaces included with the $2^{nd}$ code segment. In either of the cases of FIGS. 4 and 5, the functional spirit of interfaces Interface1 and I1 remain the same as with FIGS. 2 and 3, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 6:
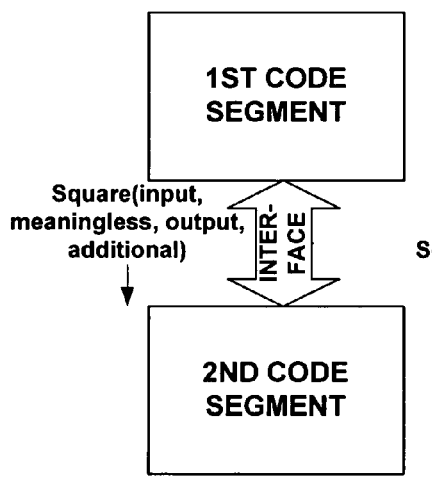
FIG. 6 is a simplified block diagram illustrating a programming interface between two code segments having certain aspects ignored, added, or redefined, illustrating the concept of redefinition.
Figure 7:
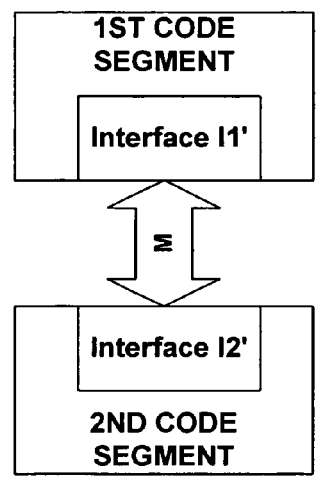
FIG. 7 is a simplified block diagram illustrating an alternate embodiment of a programming interface between two code segments having certain aspects ignored, added, or redefined, illustrating the concept of redefinition.

In some cases, it may be possible to ignore, add or redefine certain aspects (e.g., parameters) of a programming interface while still accomplishing the intended result. This is illustrated in FIGS. 6 and 7. For example, assume interface Interface1 of FIG. 2 includes a function call Square(input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 6, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 7, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 8:
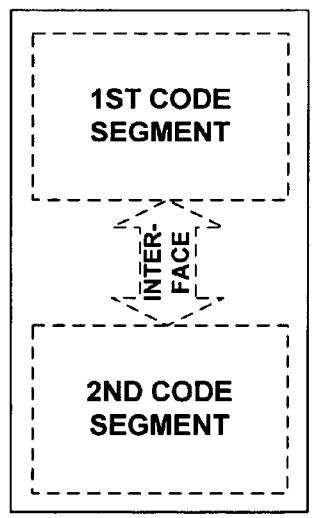
FIG. 8 is a simplified block diagram illustrating a programming interface between two code segments having some of the functionality of the two code modules merged such that the interface between them changes form, illustrating the concept of inline coding.
Figure 9:
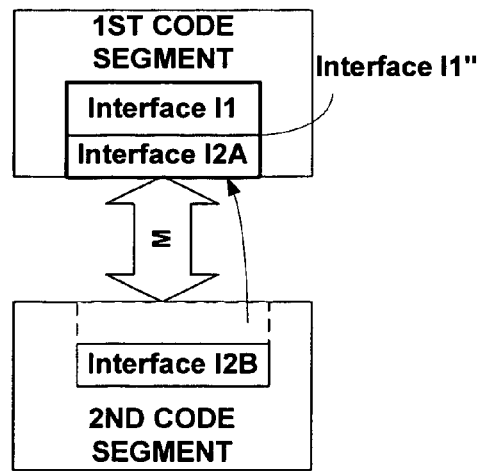
FIG. 9 is a simplified block diagram illustrating an alternate embodiment of a programming interface between two code segments having some of the functionality of the two code modules merged such that the interface between them changes form, illustrating the concept of inline coding.

It may also be feasible to merge some or all of the functionality of two separate code modules such that the "interface" between them changes form. For example, the functionality of FIGS. 2 and 3 may be converted to the functionality of FIGS. 8 and 9, respectively. In FIG. 8, the previous $1^{st}$ and $2^{nd}$ Code Segments of FIG. 2 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 9, part (or all) of interface I2 from FIG. 3 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 3 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 10:
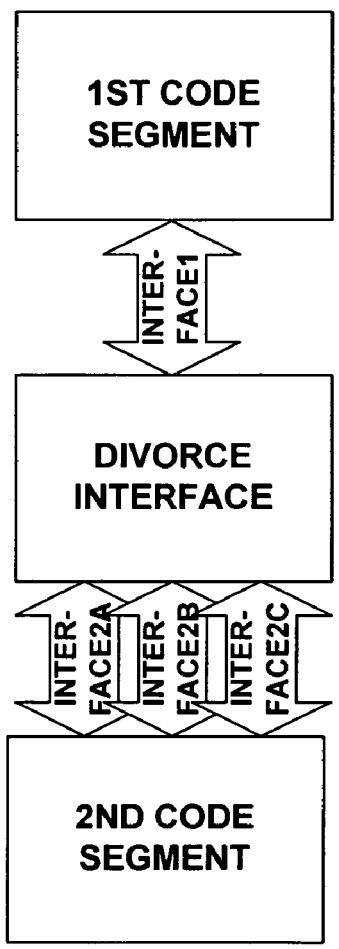
FIG. 10 is a simplified block diagram illustrating a programming interface between two code modules wherein the communication is accomplished indirectly by breaking the communication into multiple discrete communications, illustrating the concept of divorcing.
Figure 11:
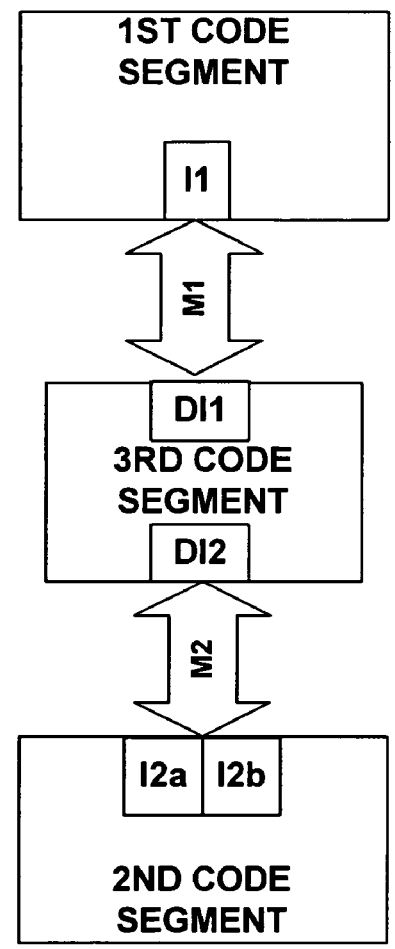
FIG. 11 is a simplified block diagram illustrating an alternate embodiment of a programming interface between two code modules wherein the communication is accomplished indirectly by breaking the communication into multiple discrete communications, illustrating the concept of divorcing.

A communication from one code segment to another may be accomplished indirectly by breaking the communication into multiple discrete communications. This is depicted schematically in FIGS. 10 and 11. As shown in FIG. 10, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 3 to a new operating system, while providing the same or similar functional result.

E. Rewriting

Figure 12:
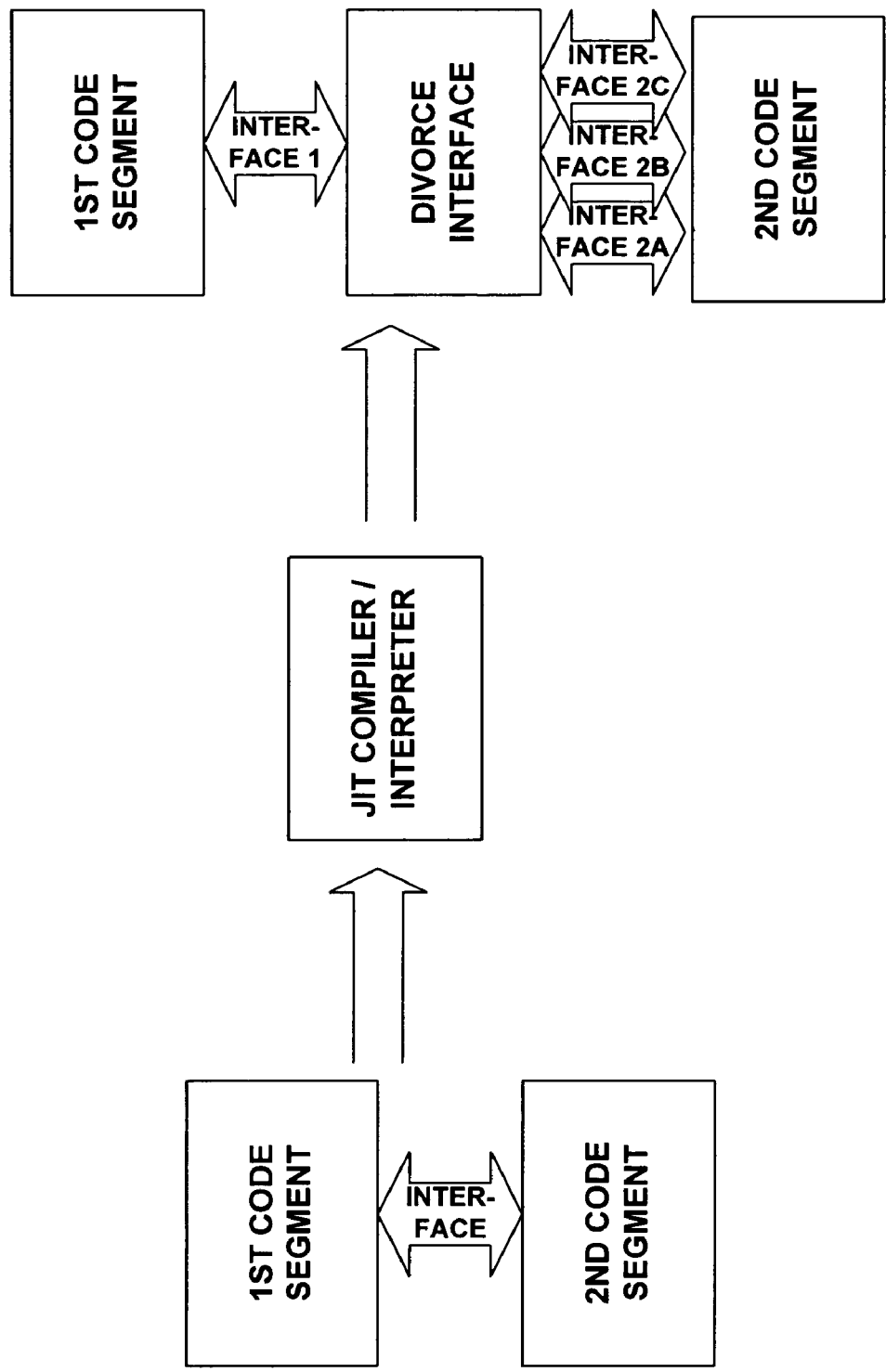
FIG. 12 is a simplified block diagram illustrating dynamically rewritten code to replace a programming interface with something else that achieves the same result, illustrating the concept of rewriting.
Figure 13:
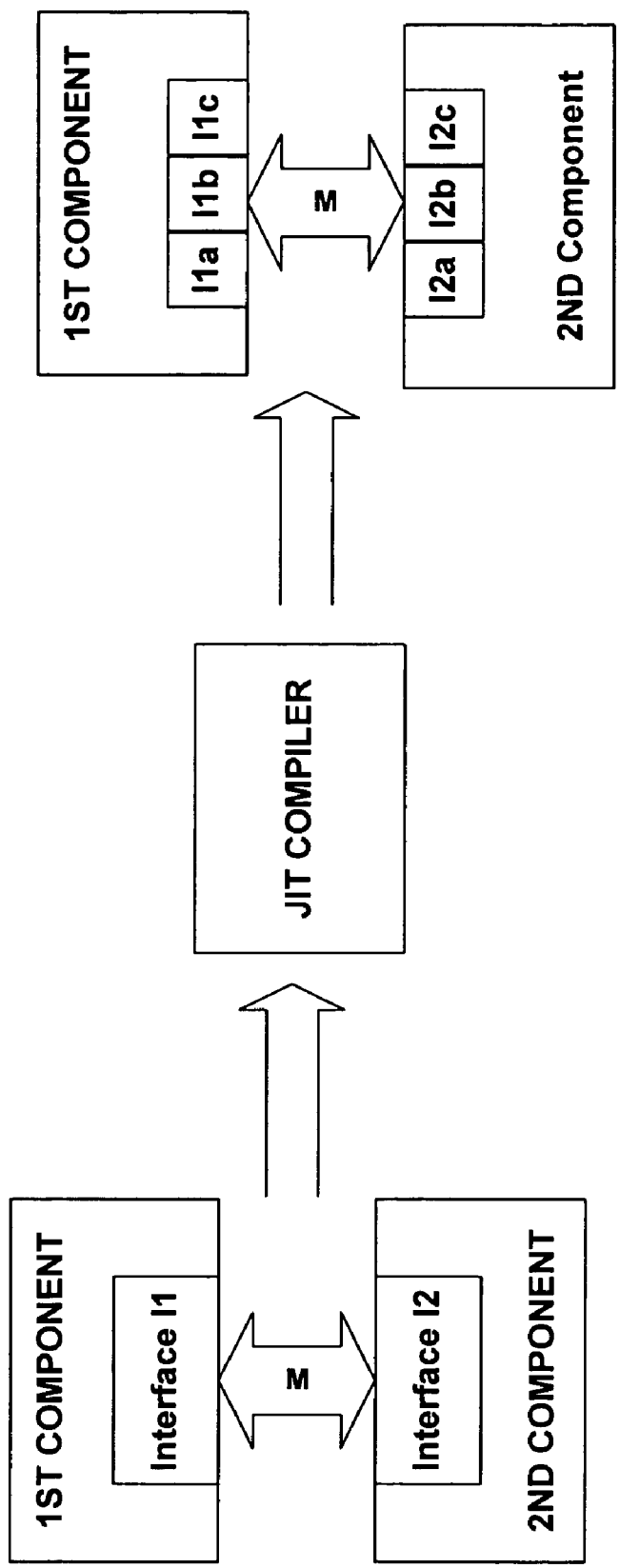
FIG. 13 is a simplified block diagram illustrating an alternate embodiment of dynamically rewritten code to replace a programming interface with something else that achieves the same result, illustrating the concept of rewriting.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12 and 13. As can be seen in FIG. 12, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 13, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2 and 3. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the grouping system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122,863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the managed P2P interfaces and methods of the present invention are not limited to the particular peer-to-peer protocol of these co-pending applications, but may be applied to other resolution and grouping protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide a managed set of functions, and particularly to any P2P system that desires to take advantage of the benefits provided by the .NET framework. Once such peer networking system that is particularly applicable to the .NET framework is described in co-pending application Ser. No. 10/351,727, entitled Peer-to-Peer Networking Framework Application Programming Interfaces, filed on Jan. 27, 2003. The teachings and disclosure of which are hereby incorporated in their entireties by reference thereto.

As discussed in the above-incorporated co-pending application describing the PNRP, and to provide some useful background, establishing peering relations between individual peers is an expensive process in existing peer-to-peer networks. In the PNRP, however, each member accumulates a routing table that contains a list of references to other members in the network. For each member entry, address information, which may include a member identification, address, the key of the member, and the distance between the key of this member and the key of the local member are obtained. Each time the local member learns about a remote member, it checks whether the member is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a member receives a query it searches for the entry in its routing table whose key best matches the target, excluding the members that have already been visited. The query is then forwarded directly to the member that advertised the entry. If there is no adequate entry, the request is sent back to the member from which the request was received; this member will try another entry in its own routing table. The request is successful if it reaches the entry whose key matches the target. It is unsuccessful if the target is not reached in the maximum number of steps, or if the member from which the request was received tries all possible neighbors and receives a negative response. In the case of successful requests, the response is relayed by all intermediate hops. It carries the address of the member that held the target key, and this entry can be inserted in the routing tables of the intermediate members.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the friendly name, etc. Preferably, each member generates its own pair of private-public keys, although such may be provided by a trusted supplier. The public key is then included as part of the member identifier. Likewise, a group creator generates group public and private keys. Only the member that created the pair of keys has the private key with which it can prove that it is the creator of the identity. In this way, identity theft may be discovered, and is, therefore, deterred.

As also discussed in this above-identified application, peer identification certificates provide integrity and validity to a peer's identity in the P2P network. These ID certificates are of the form [Version, ID, <ID Related Info>, Validity, Algorithms, $P_{Issuer}$]$K_{Issuer}$. As used in this certificate representation, Version is the certificate version, ID is the peer name to be published, <ID Related Info> represents information to be associated with the ID, Validity represents the period of validity expressed in a pair of From-To dates expressed as Universal Date Time (also know as Greenwich Mean Time (GMT)), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In such a system, graphing interfaces that are responsible for establishing and maintain a well-connected graph of peers. A description of one embodiment of such graphing interfaces is contained in co-pending application Ser. No. 10/309,865, entitled Peer-To-Peer Graphing Interfaces and Methods, filed on Dec. 4, 2002, the teaching and disclosure of which are hereby incorporated in their entireties by reference thereto. Some form of P2P name-to-address resolution 208 must also typically be provided to allow the P2P system to function. As discussed above, one such system is the PNRP system described in the above identified co-pending applications. These Win32 interfaces also include identity interfaces. A description of one embodiment of these identity management interfaces is contained in co-pending application Ser. No. 10/309,864, entitled Peer-To-Peer Identity Management Interfaces And Methods, filed on Dec. 4, 2002, the teachings and disclosure of which are hereby incorporated in their entireties by reference thereto.

As will become apparent to those skilled in the art from the following description, the APIs and methods of the present invention preferably take an object-oriented approach to their design. Objects have the base implementations for ToStrings, Equals, etc., except where explicitly called out. Collections are almost always static snapshots of an underlying dynamic lists. A GetXxx method is normally used to obtain the collection instead of using a property. Some objects can be serialized so that they can be stored or transmitted to another machine. As will become apparent, records and invitations are examples of this.

Figure 14:
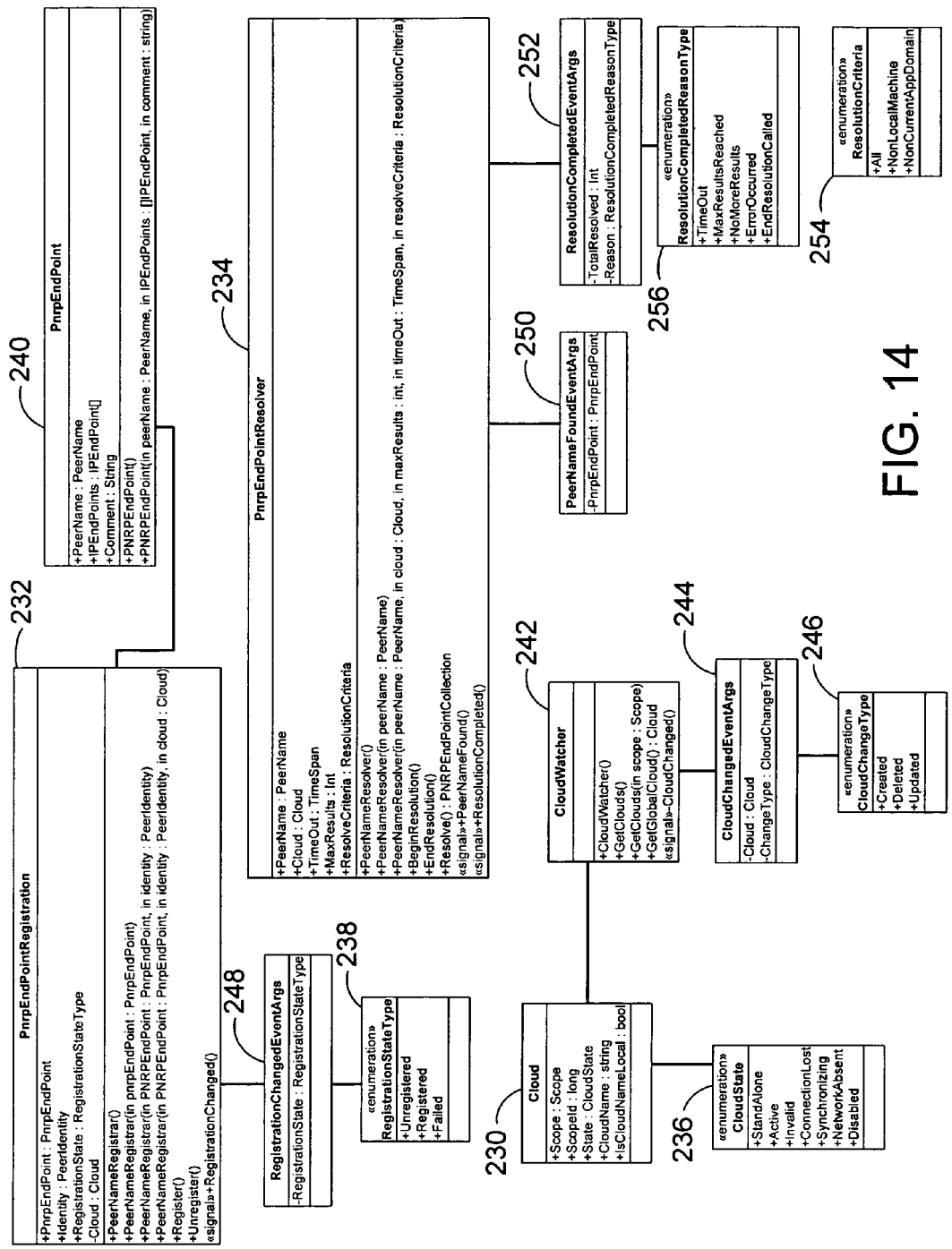
FIG. 14 illustrates the objects, collections, properties, and methods of the cloud managed class of the present invention.

As illustrated in FIG. 14, the PNRP Managed API of the present invention is segmented into 3 main areas: Clouds 230, Registrations 232, and Resolvers 234. The Clouds object 230 provides information about the clouds that are available including CloudState 236 and RegistrationStateType 238. If a cloud is available, the Registration object 232 can be used to register endpoints 240 with the PNRP protocol. Finally, if an application developer wishes to resolve a peer name to an IP address, they simply use the resolver object 234.

Clouds 230 are used for registration and resolution of peer names. The Cloud 230 has a set of properties pertaining to the cloud, and are these properties may be obtained via the static PNRP methods. In addition, clouds are monitored via the CloudWatcher object 242 as will be discussed below. One of the main purposes of the static methods is to obtain the list of clouds available to application developer for use. A developer can obtain clouds in one of two ways. The first is to use the GetGlobalCloud method. This is a quick helper method to obtain the default cloud for the machine. An example of such a method is illustrated below in Table 1.

TABLE 1

Cloud c = CloudWatcher.GetGlobalCloud( );

The above code obtains the global cloud by using the GetGlobalCloud( ) method. The second manner in which a cloud can be obtained is the GetClouds method. More specifically, an application developer can obtain clouds by Scope and cloud name. This method differs from the GetGlobalCloud( ) method because it returns a cloud collection that can be enumerated and each cloud enumerated can be utilized by the application developer. An example of such a method is illustrated below in Table 2. In this example, the code obtains the clouds on a machine, and shows a message box for each cloud's state.

TABLE 2

List<Cloud> cc = CloudWatcher.GetClouds(Global);
foreach(Cloud c in cc)
    MessageBox.Show(c.State.ToString( ));

An overview of an embodiment of the Clouds object 230 of the present invention is illustrated below in Table 3.

TABLE 3

Constructors
None
Properties
public Scope Scope {get;}
public long ScopeId {get;}
public CloudState State {get;}
public string CloudName {get;}
public bool IsCloudNameLocal {get;}
Methods
public bool Equals(object o);
public int GetHashCode( );
public Type GetType( );
public bool ReferenceEquals( );
public string ToString( );
Events
None
Exceptions TABLE 3-continued public PeerException CloudDisabledException;
public PeerException CloudNotFoundException;
public PeerException TooMuchLoadException;
Static Methods
None As may be seen from the above overview of the Clouds object, no constructors are provided. The properties of this Cloud object include the Scope in which the cloud exists, in the ScopeId, which is the Scope identifier for this cloud. The current State of the cloud is also provided as a property, as is the CloudName, which is the cloud name of the cloud. Finally, the property IsCloudNameLocal is provided to identify whether the cloud name is local to the machine or not.

The methods exposed by this Cloud object includes the Equals method which is overloaded and determines whether two cloud instances are equal. The GetHashCode method serves as a hash function for a particular type, and is suitable for use in hashing algorithms and data structures like a hash table. The GetType method retrieves the type of the current instance. The ReferenceEquals method is used to determine whether the specified cloud instances are the same instance. Finally, the ToString method is used to return the cloud name as a string.

As may also be seen by this overview presented in Table 3, the Cloud object also has some exceptions. First, the CloudDisabledException indicates that that a specified cloud name is disabled. This exception may be thrown by the resolve, GetGlobalCloud, GetCloud, or GetClouds methods. Second, this Cloud object may also throw the CloudNotFoundException, which indicates that a specified cloud name is not available. This exception may be thrown by the resolve, GetGlobalCloud, GetCloud, or GetClouds methods. Finally, this object also includes the TooMuchLoadException exception, which indicates that a peer name cannot be created because the computer does not have the resources to process the request. This exception may also be thrown by the Resolve, GetGlobalCloud, GetCloud, or GetClouds methods.

The CloudState enumeration 236 exposes various enumeration items. The first, uninitialized, indicates that the cloud is not initialized. The enumeration item Synchronizing indicates that the cloud is in the process of being initialized. The Active enumeration item indicates that the cloud is active and can be used for registration and resolution. An Invalid enumeration item indicates that the cloud is no longer valid. This could be because, for example, the network cable it unplugged. The Disabled enumeration item indicates that the cloud is disabled in the registry. The StandAlone enumeration item indicates that currently, the local node is the only node in the PNRP Cloud. Finally, the ConnectionLost enumeration item indicates that the cloud is initialized, but that it has lost its connection to the network. As may be seen from the RegistrationStateType enumeration object 238, enumerations of Unregistered, Registered, and Failed are provided.

Clouds 230 are monitored for state change via the CloudWatcher object 242. It is important to note that for each scope only, one CloudWatcher object 242 should be needed, as a single CloudWatcher object 242 monitors all clouds 230. In order to monitor clouds using a CloudWatcher object 242, a developer must simply construct a cloud watcher object and assigne the appropriate event handler, such as illustrated in Table 4, below.

TABLE 4

```
CloudWatcher cw = new CloudWatcher( );
Cw.CloudChanged += new CloudChangedEventHandler(MyCloudChangeHandler);
```

In the above code, a CloudWatcher object 242 is instantiated to monitor the updated state changes. In addition, an event handler is specified to handle the change in cloud state. The following code in Table 5, below, illustrates how the handler and CloudChangedEventArgs 244 are used to obtain the change in cloud state, and prints it out.

TABLE 5

```
private void MyCloudChangeHandler(object sender,
CloudChangeEventArgs e)
{
    MessageBox.Show(e.Cloud.ToString + e.ChangeType.ToString( ));
}
```

With these objects in mind, an overview of an embodiment of the Cloud Watcher object of the present invention is illustrated below in Table 6.

TABLE 6

```
Constructors
CloudWatcher( );
Properties
None
Methods
public bool Equals(object o);
public int GetHashCode( );
public Type GetType( );
public bool ReferenceEquals( );
public string ToString( );
public ISynchronizeInvoke SynchronizingObject {get;}
Events
public event CloudChangedEventHandler CloudChanged;
Exceptions
None
Static Methods
public List<Cloud> GetClouds( );
public List<Cloud> GetClouds(Scope scope);
public Cloud GetGlobalCloud( );
```

As may be seen from this Table 6, the CloudWatcher object includes the CloudWatcher constructor which is utilized to instantiate a CloudWatcher object. The methods exposed by the CloudWatcher object includes the Equals method, which is overloaded and determines whether two CloudWatcher instances are equal. The GetHashCode method serves as a hash function for a particular type, and is suitable for use in hashing algorithms and data structures like a hashing table. The GetType method retrieves the type of the current instance. The ReferenceEquals method determines whether the specified CloudWatcher instances are the same instance. The ToString method returns the string representation of the CloudWatcher object System.Net.PeerToPeer.CloudWatcher. Finally, SynchronizingObject is the object used to synchronize between threads.

The single event exposed by this object is the CloudChanged event, which is the event raised when a cloud has changed in the specified scope. While no exceptions are shown in Table 6, one embodiment of the present invention may include the CloudDisabledException to indicate a specified cloud name is disabled. This exception is thrown by the resolve, GetGlobalCloud, GetCloud, and GetClouds methods.

This embodiment of the CloudWatcher object of the present invention also includes Static Methods on the Namespace. These methods include the GetGlobalCloud method that returns the global cloud. The GetClouds methods utilizes the scope as a parameter and returns a list of clouds in that given scope. Finally, the GetClouds method without any parameter returns a list of all clouds on the system.

As indicated above, the CloudChangedEventArgs 244 includes the Cloud and the ChangeType property. The Cloud property identifies the cloud that has changed, while the ChangeType property identifies the type of change that occurred with the Cloud property. This ChangeType may be any one of the Cloud ChangeType enumerations 246, including Created, Deleted, or Updated. The Created enumeration object indicates that a new cloud has been created for that given scope. The Deleted enumeration object indicates that an existing cloud has been deleted for the given scope. Finally, the Updated enumeration item indicates that an existing cloud has been updated in some manner.

The PnrpEndPoint object 240 is simply a set of properties specifying information about a peer name that can be registered via the PnrpEndPointRegistration object 232 or has been obtained via the Pnrp.Resolve API or the PnrpEndPointResolver object 234 as will be discussed below. An overview of an embodiment of the PnrpEndPoint object 240 is illustrated below in Table 7.

TABLE 7

```
Constructors
PnrpEndPoint( );
PnrpEndPoint(PeerName peerName, IPEndPoint[ ] endpoints,
    String comment);
Properties
public PeerName PeerName {get; set;}
public IPEndPoint[ ] IPEndPoints {get; set;}
public String Comment {get; set;}
Methods
public bool Equals(object o);
public int GetHashCode( );
public Type GetType( );
public bool ReferenceEquals( );
public string ToString( );
Events
None
Exceptions
None
Static Methods
None
```

As may be seen from the overview provided in Table 7, the PnrpEndPoint object includes the PnrpEndPoint constructor that creates a peer name that can be used for registration in a cloud. Additionally, a PnrpEndPoint constructor utilizing the PeerName, IPEndPoints, and cloud parameters is provided to create a peer name that can be used for registration in a cloud using these specified parameters.

The properties of this object include the PeerName associated to be registered or resolved, the IPEndPoint (IP Address) to be registered or found via the resolver, and a Comment property, which is a comment associated with the name to be registered or resolved. The methods provided by this object include the Equals method, which is overloaded and determines whether two PnrpEndPoint instances are equal. The GetHashCode method is also provided and serves as a hash function for a particular type. This method is suitable for use in hashing algorithms and data structures like a hash table. The GetType method is also provided to retrieve the type of the current instance. The ReferenceEquals method is also provided, and determines whether the specified PnrpEndPoint instances are the same instance. Finally, the ToString method is provided to return the PeerName of the PnrpEndPoint as a string.

The PnrpEndPointRegistration object 232 allows a PnrpEndPoint 240 to be registered in PNRP. In order to construct a PnrpEndPointRegistration object 232, an application developer must simply call the constructor. It is important to note that before the PeerName specified in the PnrpEndPoint property can be registered, the PnrpEndPoint must have the cloud, PeerName, and endpoint properties set; otherwise, when the Register method will throw an exception. In order to register a name in PNRP via the PnrpEndPointRegistration object 232, the application developer must ensure the PnrpEndPoint 240 has the necessary information and set the RefreshTime property. Once the initial properties of the object have been setup correctly, the developer can register the Peer Name via the Register( ) method. If the object has not been setup properly, the Register method will throw an exception. An example of code that registers a peer name for 1 hour in the cloud specified in the PnrpEndPoint is illustrated below in Table 8.

TABLE 8

PnrpEndPointRegistration pnr = new
PnrpEndPointRegistration(myDiscoPeerName, myIdentity,
Pnrp.GetGlobalCloud( ));
pnr.Register( );

While a peer name is registered, the fields in the PnrpEndPointRegistration object 232 cannot be changed by the application developer. In order to change the fields in the PnrpEndPointRegistration object 232, the developer must first call the unregister method. During the course of a PnrpEndPointRegistration lifetime, something might happen that disrupts the registration of the peer name, such as a cloud being deleted. If a change to the registration occurs, the application developer will be notified via the RegistrationChanged event. An example of code that constructs a PnrpEndPointRegistration object 232, assigns an event handler, and registers a peer name is illustrated below in Table 9. It then shows how the event handler will show a message box about the state change when it occurs.

TABLE 9

PnrpEndPointRegistration pnr = new
PnrpEndPointRegistration(myDiscoPeerName, myIdentity,
Pnrp.GetGlobalCloud( ));
pnr.RegistrationChanged += new
RegistrationChangedEventHandler(MyRegistrationChangedHandler);
pnr.Register( );
...
private void MyRegistrationChangedHandler(object sender,
RegistrationChangedEventArgs e)
{
    MessageBox.Show(e.RegistrationState.ToString( ));
}

The lifetime of the PnrpEndPointRegistration object 232 is the same as any object. That is, it is valid in the scope in which it is declared. If the object goes out of scope, then the PeerName registered is unregistered. Applications that wish for a peer name to be registered for the lifetime of the process, should declare and register in the application namespace scope.

With these principles in mind, an overview of an embodiment of the PnrpEndPointRegistration object is illustrated below in Table 10.

TABLE 10

Constructors
public PnrpEndPointRegistration( );
public PnrpEndPointRegistration(PnrpEndPoint PnrpEndPoint);
public PnrpEndPointRegistration(PnrpEndPoint PnrpEndPoint,
PeerIdentity
identity);
public PnrpEndPointRegistration(PnrpEndPoint PnrpEndPoint,
PeerIdentity identity, Cloud cloud);
Properties
public PnrpEndPoint PnrpEndPoint {get; set;}
public PeerIdentity identity {get; set;}
public RegistrationStateType RegistrationState {get;}
public Cloud Cloud {get; set;}
public ISynchronizeInvoke SynchronizingObject {get;}
Methods
public void Register( );
public void Unregister( );
public bool Equals(object o);
public int GetHashCode( );
public Type GetType( );
public bool ReferenceEquals( );
public string ToString( );
Events
public event RegistrationChangedEventHandler RegistrationChanged;
Exceptions
public PeerException CloudDisabledException;
public PeerException CloudNotFoundException;
public PeerException InvalidIdentityException;
public PeerException TooMuchLoadException;
public Exception InvalidOperationException;
public PeerException NoIPEndPointException;
public PeerException DuplicateRegistrationException
Static Methods
None As may be seen from this overview of Table 10, the PnrpEndPointRegistration object includes several constructors. First, the PnrpEndPointRegistration constructor is a blank construction for a PnrpEndPointResolver. It should be noted that all fields must be filled in before registration can happen. Secondly, a PnrpEndPointRegistration having the PnrpEndPoint parameter is used to construct a PnrpEndPointRegistration based on a given PeerName. The third PnrpEndPointRegistration constructor utilizes the PnrpEndPoint and Identity parameters, and constructs a PnrpEndPointRegistration based on this given PeerName and Identity. Finally, the PnrpEndPointRegistration utilizing the PnrpEndPoint, Identify, and refresh Time parameters is used to construct a PnrpEndPointRegistration based on these given PeerName, Identity, and TimeSpan parameters.

The properties of this PnrpEndPointRegistration object include the PeerName, which is the resolver peer name to be registered in PNRP. The Identity property provides the identity with which the resolver peer name is associated. The RegistrationState property indicates the current state registration of this particular peer name. The Cloud property indicates the cloud in which the name will be registered. Finally, the SynchronizingObject is the object used to synchronize between threads.

This PnrpEndPointRegistration object also provides numerous methods. The Register method is used to register the given PeerName with PNRP, and the Unregister method is used to unregister the specified PeerName from PNRP. The Equals method, which is overloaded, determines whether two PnrpEndPointRegistration instances are equal. The GetHashCode method serves as a hash function for a particular type, suitable for use in hashing algorithms and data structures like a hash table. The GetType method retrieves the type of the current instance. The ReferenceEquals method determines whether the specified PnrpEndPointRegistration instances are the same instance. Finally, the ToString method returns the PeerName registered as a string.

This PnrpEndPointRegistration object also provides various exceptions. The first exception, CloudDisabled, is thrown by the Register method, and indicates that the specified cloud name is disabled. The CloudNotFound exception is also thrown by the Register method, and indicates that a specified cloud name is not available. The InvalidIdentity exception is also thrown by the Register method, and indicates that a specified identity cannot be accessed. The InvalidOperation exception can be thrown by any method or settable property where the RegistrationState=registered. This exception indicates that the specified method or property could not be called/changed due to the fact that the name is currently registered in PNRP. The NoIPEndPoint exception may be thrown by the Register method, and indicates that the NoIPEndPoint has been specified in the PnrpEndPoint. The TooMuchLoad exception, which can also be thrown by the Register method, indicates that a peer name cannot be created because the computer does not have the resources to process the request. Finally, the DuplicateRegistration exception is also thrown by the Register method, and indicates that an identical registration already exists.

In this embodiment of the PnrpEndPointRegistration object, a single event is provided. This event, the RegistrationChanged event is raised when the registration state fails. The event argument for the RegistrationChanged event is the RegistrationChangedEventArgs. As may also be seen from this Table 10, no Static Methods are provided on the Namespace.

The RegistrationStateType enumeration 238 includes Unregistered, Registered, and Failed enumerations. In Registered enumeration indicates that the given resolvable peer name is not registered in any cloud currently. The Registered enumeration indicates that the given resolvable peer name is registered in the cloud. Finally, the failed enumeration item indicates that the registration has failed. The RegistrationChangedEventArgs 248 includes the RegistrationState property, and provides the current registration state of the peer name that raised the event.

The PnrpEndPointResolver object 234 resolves a peer name string to a PnrpEndPoint object 240. It is the object by which the IP address associated with a peer name is obtained. In addition to the GetGlobalCloud helper function, the static methods allows a developer to do a quick synchronous resolution without having to instantiate a PnrpEndPointResolver object 234. In order to do a "one only resolve" on the default cloud the application developer must simply call the resolve method. An example of code that gets a resolvable peer name from the synchronous resolve method is illustrated in Table 11, below.

TABLE 11

PnrpEndPoint rpn = PnrpEndPointResolver.Resolve(new PeerName("0.mypeername"));

In order to resolve a peer name to an IP address, the resolver object 234 must first be set up. First an application developer must construct the object, indicate the cloud in which the resolution should happen, and specify the maximum amount of results to obtain. The following code illustrated in Table 12 sets up a proper PnrpEndPointResolver object 234 to resolve "myPeerName" in the default cloud, and obtain up to 5 results.

TABLE 12

PnrpEndPointResolver pnres = PnrpEndPointResolver (new PeerName("0.myPeerName"));
pnres.Cloud = Pnrp.GetGlobalCloud( );
pnres.MaxResults = 5;

Resolution of a peer name can occur via the synchronous or asynchronous API. The developer must construct and setup a PnrpEndPointResolver 234 and then begin resolution. If the developer utilizes the synchronous Resolve method, the results will be a collection<=to the MaxResults. To obtain multiple resolutions, the asynchronous methods must be used. The following code illustrated in Table 13 resolves a peer name to a resolvable peer name synchronously.

TABLE 13

PnrpEndPointResolver pnres = PnrpEndPointResolver (new PeerName("0.myPeerName"));
pnres.Cloud = Pnrp.GetGlobalCloud( );
List<PnrpEndPoint> pnrpEndColl = pnres.Resolve( );

In order to use the asynchronous version, the application developer must specify the event handler and call the BeginResolution method. An example of code that sets up a resolver object 234, begins resolution, then when a peer name is found, prints out the end point associated with that peer name is illustrated below in Table 14.

TABLE 14

PnrpEndPointResolver pnres = PnrpEndPointResolver (new PeerName("0.myPeerName"));
pnres.Cloud = Pnrp.GetGlobalCloud( );
pnres.MaxResults = 5;
pnres.PeerNameFound += new PeerNameFoundEventHandler(MyPeerNameFoundHandler);
pnres.BeginResolution( );
...
private void MyPeerNameFoundHandler(object sender, PeerNameFoundEventArgs e)
{
    MessageBox.Show(e.PeerName.Endpoint.ToString( ));
}

A resolution is finished if one of three things happen. First, a resolution is finished when the maximum number of results is reached. Second, a resolution is complete if no more results are found. Finally, resolution is completed if the application calls the EndResolution method. In all three cases, the ResolutionCompleted event is raised, and the RegistrationCompleted event handler is called. When the event is raised, the total number of peer names that were resolved is returned to the application developer. An example of code that sets up a resolver object, begins resolution, then when a peer name is found, prints out the end point associated with that peer name is illustrated below in Table 15. If the endpoint = = null for some unknown reason, resolution is stopped. Once resolution is completed for one of the three reasons mentioned above, the event handler shows a message box indicating the total number of results returned.

TABLE 15

```
PnrpEndPointResolver pnres = PnrpEndPointResolver (new
PeerName("0.myPeerName"));
pnres.Cloud = Pnrp.GetGlobalCloud( );
pnres.MaxResults = 5;
pnres.PeerNameFound += new
PeerNameFoundEventHandler(MyPeerNameFoundHandler);
pnres.ResolutionCompleted += new
ResolutionCompletedEventHandler(MyResolutionCompletedHandler);
pnres.BeginResolution( );
. . .
private void MyPeerNameFoundHandler(object sender, PeerNameFoundEventArgs
e)
{
        MessageBox.Show(e.PeerName.Endpoint.ToString( ));
        if (e.PnrpEndPoint.PeerName.IPEndPoint[ ] == null)
                this.EndResolution( );
}
private void MyResolutionCompletedHandler(object sender,
ResolutionCompletedEventArgs e)
{
        MessageBox.Show(e.TotalResolved.ToString( ));
}
```

With these principles in mind, an overview of the PnrpEndPointResolver managed class is illustrated below in Table 16.

TABLE 16

```
Constructors
PnrpEndPointResolver( );
PnrpEndPointResolver(PeerName peerName);
PnrpEndPointResolver(PeerName peerName, Cloud cloud, int maxResults,
TimeSpan timeOut, ResolveCriteriaFlagsType resolveCriteriaFlags);
Properties
public PeerName PeerName {get; set;}
public Cloud Cloud {get; set;}
public int MaxResults {get; set;}
public TimeSpan TimeOut {get; set;}
public ResolveCriteriaType ResolveCriteria {get; set;}
public ISynchronizeInvoke SynchronizingObject {get;}
Methods
public void BeginResolution( );
public void EndResolution( );
public List<PnrpEndPoint> Resolve( );
public bool Equals(object o);
public int GetHashCode( );
public Type GetType( );
public bool ReferenceEquals( );
public string ToString( );
Events
public event PeerNameFoundEventHandler PeerNameFound;
public event ResolutionCompletedEventHandler ResolutionCompleted;
Exceptions
public PeerException CloudDisabledException;
public PeerException CloudNotFoundException;
```

TABLE 16-continued

```
public Exception InvalidIdentityException;
public PeerException TooMuchLoadException;
Static Methods
public PnrpEndPoint Resolve(PeerName peerName);
public PnrpEndPoind Resolve(PeerName peerName, Cloud cloud);
```

As may be seen from this overview of Table 16, the PnrpEndPointResolver object includes three constructors. The first PnrpEndPointResolver constructor simply constructs a PnrpEndPointResolver object for name resolution. The second PnrpEndPointResolver utilizes the PeerName as a parameter, and constructs a PnrpEndPointResolver using defaults and the specified PeerName. Finally, the third PnrpEndPointResolver constructor utilizes the PeerName, the Cloud, MaxResults, timeout, and ResolveCriteriaFlags as parameters to construct a resolver with the specified properties.

The properties of this embodiment to the PnrpEndPointResolver object include the PeerName to be resolved. The Cloud property is also included and indicates the cloud in which resolution will be attempted. The default for this property is global. The MaxResults property defines the maximum number of names to resolve, and has a default value of 1. The ResolveCriteria property provides the resolve criteria for the resolution object. The default for this property is no flags, which equals Remote. The TimeOut property indicates the TimeSpan that represents the timeout the user has set. The default for this property is 45 seconds and one embodiment of the present invention, although other time periods may be provided as a default as desired. The SynchronizingObject property is the object used to synchronize between threads.

The PnrpEndPointResolver object of the present invention also includes various methods. The BeginResolution methods begins the asynchronous resolution of the specified peer name in the specified cloud, while the EndResolution method ends the asynchronous resolution of the specified peer name in the specified cloud. The Resolve method synchronously resolves the specified peer name in the specified cloud. The Equals method, which is overloaded, determine whether two PnrpEndPointResolver instances are equal. The GetHash- Code method serves as a hash function for a particular type, and is suitable for use in hashing algorithms and data structures like a hash table. The GetType method retrieves the type of the current instance. The ReferenceEquals method determines whether the specified PnrpEndPointResolver instances are the same instance. Finally, the ToString method returns the PeerName being resolved as a string.

This PnrpEndPointResolver object also includes various exceptions. The first exception, CloudDisabled, is thrown by the Resolve method and indicates that a specified cloud name is disabled. The CloudNotFound exception, which is also thrown by the Resolve method, indicates that a specified cloud name is not available. The InvalidIdentity exception, also thrown by the Resolve method, indicates that a specified identity cannot be accessed. Finally, the TooMuchLoad exception, which is also thrown by the Resolve method, indicates that a peer name cannot be created because the computer does not have the resources to process the request.

As also may be seen from this Table 16, the PnrpEndPointResolver object includes the PeerNameFound event which is raised when a PnrpEndPoint is found. Additionally, the ResolutionCompleted event is provided, and is raised when the MaxResults has been reached, no name was found, or when the EndResolution method is called.

This object also includes two Static Methods on the Namespace. The first is the Resolve method that utilizes the PeerName as a parameter and returns the PnrpEndPoint. This Static Method resolves one remote name synchronously. The Resolve Static Method utilizing the PeerName and Cloud parameters also returns the PnrpEndPoint, and resolves one remote name synchronously.

The PeerNameFoundEventArgs 250 includes the PeerName property which is the PnrpEndPoint that was resolved as a result of an asynchronous resolution. The ResolutionCompletedEventArgs 252 includes a Reason property indicating the reason the resolution completed, and the TotalResolved property, which is the total number of PnrpEndPoints found during the resolution.

The ResolutionCriteria enumeration 254 includes the All flag item sets the resolve in all criteria. The NonLocalMachine flag item sets the resolution criteria that all except for those on the local machine should be resolved. Finally, the NonCurrentAppDomain flag item indicates that the resolution should include all except for the current application and the associated app domain.

The ResolutionCompletedReasonType enumeration 256 includes the TimeOut, MaxResultsReached, NoMoreResults, ErrorOccurred, and EndResolutionCalled enumeration items. The TimeOut enumeration item indicates that the resolution was completed because the specified timeout was reached. Similarly, the MaxResultsReached enumeration item indicates that the resolution was completed because the specified max results set in the resolution was reached. The NoMoreResults enumeration item indicates that the resolution was completed because no more results could be obtained. The ErrorOccurred enumeration item indicates that the resolution was completed because an unspecified error occurred with the resolution. Finally, the EndResolutionCalled enumeration item indicates that the resolution was completed because the application has ended the resolution via the end resolution method.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of monitoring, by an application, peer-to-peer clouds in a managed framework, the method comprising:
creating a managed set of peer cloud class objects wherein each peer cloud class object of the managed set of peer cloud class objects contains a scope, a scope identification, a current state, a cloud name, and an indication of whether the cloud name is local;
creating a single managed peer-to-peer networking cloud interface object that:
exposes a set of at least three methods to a calling application for monitoring one or more peer-to-peer clouds, wherein the set of at least three methods are implemented in a set of objects separate and distinct from the single managed peer-to-peer networking cloud interface object, the calling application, and the managed set of peer cloud class objects, and wherein the set of at least three methods include:
a GetGlobalCloud method that outputs a default peer cloud class object from the managed set of peer cloud class objects, the default peer cloud class object corresponding to a default cloud for a node on which the calling application resides,
a GetClouds method that outputs a list of peer cloud class objects from the managed set of peer cloud class objects, the list of peer cloud class objects corresponding to a set of clouds on a peer-to-peer system on which the calling application resides, and
a CloudWatcher method that outputs an indication of a cloud state change on the peer-to-peer system; and
provides a CloudChanged event corresponding to the cloud state change, wherein the CloudChanged event identifies a cloud having the cloud state change and a cloud state change type, and wherein the CloudChanged event is raised when the cloud state change occurs;
selecting, by the calling application, one method from the set of at least three methods exposed by the single managed peer-to-peer networking cloud interface object;
communicating with the single managed peer-to-peer networking cloud interface object by the calling application;
passing, by the calling application to the single managed peer-to-peer networking cloud interface object, parameters required by the selected method; and
initiating the selected method.

2. The method of claim 1, further comprising exposing a set of at least six current state values for the current state of each peer cloud class object, the set of at least six current state values including:
- an UninitializedCloud value for indicating that a cloud corresponding to the each peer cloud class object is uninitialized,
- a SynchronizingCloud value for indicating that the cloud is being initialized,
- an ActiveCloud value for indicating that the cloud is active;
- a DisabledCloud value for indicating that the cloud is disabled in a peer-to-peer registry,
- a StandaloneCloud value for indicating that a local node on which the current application resides is an only node in the cloud, and
- a ConnectionLostCloud value for indicating that the cloud is active and is unconnected to the peer-to-peer system.

3. The method of claim 1, wherein:
- selecting one method from the set of at least three methods comprises selecting the GetClouds method,
- passing parameters required by the selected method comprises passing a scope parameter, and
- initiating the selected method comprises initiating the GetClouds method, and the GetClouds method outputs the list of peer cloud class objects corresponding to a set of clouds of a scope corresponding to the scope parameter.

4. The method of claim 1, wherein:
- selecting one method from the set of at least three methods comprises selecting the GetClouds method,
- passing parameters required by the selected method comprises passing no parameters, and
- initiating the selected method comprises initiating the GetClouds method, and the GetClouds method outputs the list of peer cloud class objects corresponding to all clouds of the peer-to-peer system.

5. The method of claim 1, wherein:
- selecting one method from the set of at least three methods comprises selecting the CloudWatcher method, and
- initiating the selected method comprises initiating the CloudWatcher method for a given scope, and the CloudWatcher method outputs an indication of at least one peer cloud class object from the managed set of peer cloud class objects, the cloud of the at least one peer cloud class object in the given scope and having the cloud change.

6. The method of claim 1, further comprising exposing a set of cloud state change type values for the cloud state change type, the set of cloud state change type values including:
- a CreatedCloud value for indicating that a new cloud has been created for the given scope,
- a DeletedCloud value for indicating that a previously existing cloud has been deleted for the given scope, and
- an UpdatedCloud value for indicating that a currently existing cloud of the given scope has been updated.

* * * * *